United States Patent
Pinewski et al.

(10) Patent No.: US 7,705,555 B2
(45) Date of Patent: Apr. 27, 2010

(54) METHOD AND CONTROLLER FOR DETECTING A STALL CONDITION IN A STEPPING MOTOR DURING MICRO-STEPPING

(75) Inventors: Peter J. Pinewski, Anoka, MN (US); T. Jeffrey Reiter, Dearborn, MI (US)

(73) Assignee: Freescale Semiconductor, Inc., Austin, TX (US)

( * ) Notice: Subject to any disclaimer, the term of this patent is extended or adjusted under 35 U.S.C. 154(b) by 307 days.

(21) Appl. No.: 11/959,057

(22) Filed: Dec. 18, 2007

(65) Prior Publication Data

US 2009/0153093 A1 Jun. 18, 2009

(51) Int. Cl.
*H02P 8/34* (2006.01)

(52) U.S. Cl. .......... 318/696; 318/430; 318/434; 318/685; 324/772

(58) Field of Classification Search .......... 318/430, 318/434, 400.35, 685, 696, 671; 324/545, 324/772; 361/23, 30
See application file for complete search history.

(56) References Cited

U.S. PATENT DOCUMENTS

| | | | |
|---|---|---|---|
| 5,032,781 A | 7/1991 | Kronenberg | |
| 5,287,050 A | 2/1994 | Kronenberg et al. | |
| 6,611,072 B1 * | 8/2003 | Ellerthorpe et al. | 310/68 C |
| 6,642,687 B2 * | 11/2003 | Aoshima | 318/696 |
| 6,667,595 B2 * | 12/2003 | Wiseman | 318/696 |
| 6,713,985 B2 * | 3/2004 | Aoshima | 318/696 |
| 6,861,817 B2 | 3/2005 | Pigott et al. | |
| 7,145,309 B2 | 12/2006 | Reiter et al. | |
| 7,224,140 B2 | 5/2007 | Arefeen et al. | |
| 7,239,108 B2 | 7/2007 | Best | |
| 2003/0117100 A1 * | 6/2003 | Pigott et al. | 318/685 |
| 2007/0132422 A1 * | 6/2007 | Rondot et al. | 318/685 |
| 2008/0100249 A1 * | 5/2008 | Coutu | 318/561 |
| 2008/0265824 A1 * | 10/2008 | Yim | 318/632 |
| 2008/0290828 A1 * | 11/2008 | Haas et al. | 318/434 |
| 2009/0066274 A1 * | 3/2009 | Liu et al. | 318/383 |

FOREIGN PATENT DOCUMENTS

EP 0848259 A1 6/1998

OTHER PUBLICATIONS

Motorola,Inc: "SSD Stepper Stall Detector Block Guide V01.00"; USA, Mar. 2004.
Freescale Semiconductor, Inc: "Introduction to the Stepper Stall Detector Module"; USA, Feb. 2007.

* cited by examiner

*Primary Examiner*—Paul Ip
(74) *Attorney, Agent, or Firm*—Daniel D. Hill

(57) ABSTRACT

A method is provided for detecting a stall condition in a stepping motor. The stepping motor has two coils and a rotor, and is micro-stepped by substantially continuously driving both of the two coils with out-of-phase time varying voltages. The method includes stepping the stepping motor to a next micro-step. It is then determined when a predetermined motor parameter of a first coil of the two coils is to be sampled. To sample the predetermined motor parameter of, for example, the first coil, the first coil is opened for a predetermined period, wherein the predetermined period is less than or equal to a micro-step. Then the first coil is sampled during the predetermined period and the result of sampling is integrated and used to increment or decrement an accumulated value. If the accumulated value is less than a preset value, then a stall condition exists.

20 Claims, 7 Drawing Sheets

METHOD AND CONTROLLER FOR DETECTING A STALL CONDITION IN A STEPPING MOTOR DURING MICRO-STEPPING

BACKGROUND

1. Field

This disclosure relates generally to motors, and more specifically, to a method and controller for detecting a stall condition in a motor during micro-stepping.

2. Related Art

A stepping motor is a type of motor that is incrementally stepped between various rotational positions. A typical stepping motor includes two coils and a rotor. The coils are oriented generally perpendicular to each other and are alternately driven to cause the rotor to turn. A motor controller is used to control the energizing and de-energizing of the coils. A "full-step" method of motor control first energizes one coil in one polarity while the other coil is off. After 90 degrees of rotation, the first coil is turned off and the other coil is turned on in the opposite polarity for another 90 degrees. Then that coil is turned off and the first coil is re-energized for 90 degrees with a polarity different than before. Because the full-step method only allows steps of 90 degrees of rotation, a "micro-step" method of motor control was developed to provide better resolution. In one micro-step method, both coils are generally continuously driven with stepped voltages that are out of phase with each other. The stepped voltages vary from a positive maximum value to a negative maximum value.

Stepping motors are commonly used to move the pointer or needle of automotive gauges, such as for example, a speedometer or tachometer. In these applications, a return-to-zero (RTZ) technique is used to return the gauge pointer to a known position. This is used to re-synchronize the motor position in the event that the absolute motor position is lost. A loss in motor position could be caused by a number of reasons. For example, power may be lost while the motor is running or a motor controller loses synchronization due to an increase in motor load.

There are several RTZ techniques that have been employed which utilize a full-step control method to sense the stall condition. FIG. 1 illustrates full-step driving currents for a two phase stepping motor having coils A and B (not shown) in accordance with the prior art. With the full-step method, one of the motor coils is driven while the other coil un-driven. In FIG. 1, each time interval represents 90 degrees of rotation, or one full-step. At time interval 0, coil B is driven with a maximum positive current while coil A is not driven. At time interval 1, coil A is driven with a maximum positive current while coil B is not driven. At time interval 2, coil B is driven with a maximum negative current while coil A is not driven. Finally, at time interval 3, coil A is driven with a maximum negative current while coil B is not driven. During each of the full steps, the un-driven coil can be sampled to detect motor movement. The full-step control method suffers from several problems. First, the full-step movement is choppy and can sometimes be visibly seen and heard in the pointer movement if the rotation speed is slow. Second, the full-step control method can limit the maximum stall detect speed since it is desired to sample the coil after the load stabilizes to the new full-step position. Third, the detection resolution is limited to a full-step boundary which is one quarter of an electrical revolution.

Therefore, what is needed is a way to detect a stall condition in a stepping motor that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
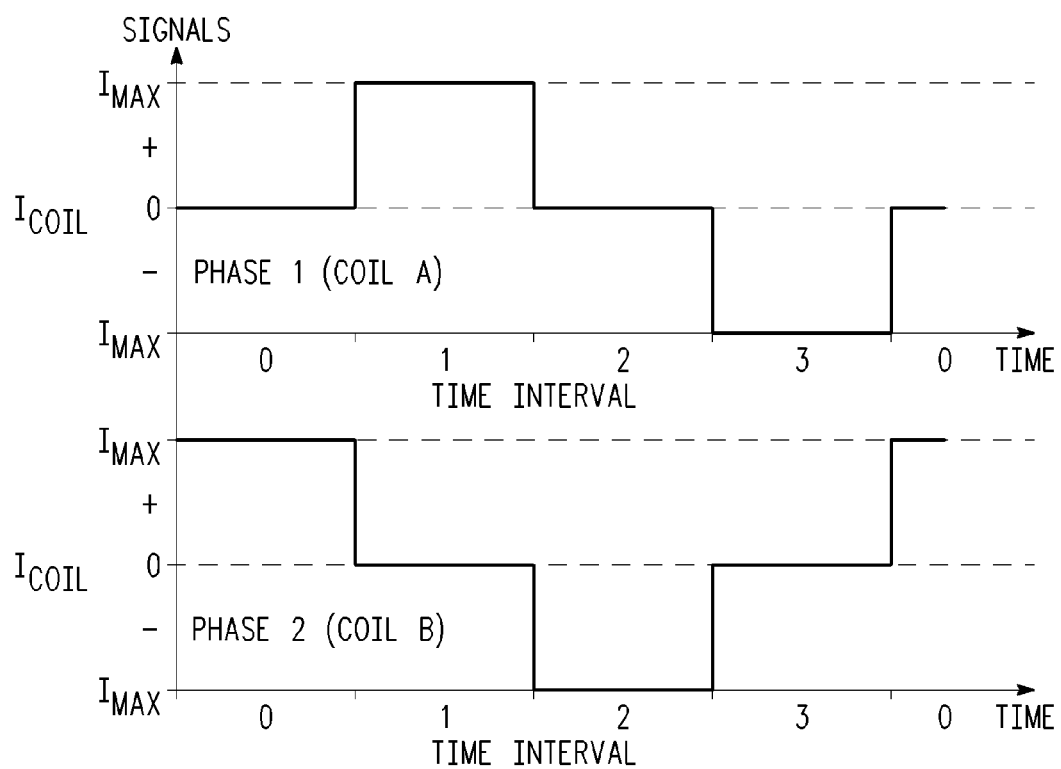
FIG. 1 illustrates coil drive currents for full-step driving of a stepping motor in accordance with the prior art.

Generally, there is provided, a motor controller and method for detecting a stall condition in a stepping motor. The stepping motor is driven in a micro-stepped manner by a coil driving circuit of a motor controller. The coil driving circuit micro-steps the stepper motor by supplying each of first and second coils with substantially continuous out-of-phase time varying voltages. One of the normally driven coils is opened for a micro-step or a portion of a micro-step and then a particular motor parameter is sampled to detect motor movement. In one embodiment, the motor parameter is back electro-magnetic force (BEMF). In another embodiment, the motor parameter is a flyback voltage. In another embodiment, the motor parameter is motor flux. In another embodiment, the motor parameter is motor energy. Note that integrating BEMF results in motor flux and integrating the flyback voltage is motor energy. Because the sample is taken during a micro-step instead of a larger full-step, the motor movement during stall detection is relatively smooth, even when motor operation is relatively slow. The smooth motor movement causes little or no oscillation on the load when the sample is taken, thus providing more accurate sampling and increased motor speed during stall detection. In addition, sampling during micro-stepping can provide better resolution during high speed operation than full step stall detection.

In one aspect, there is provided a method for detecting a stall condition in a stepping motor, the stepping motor having two coils and a rotor, the stepping motor being micro-stepped by substantially continuously driving both of the two coils with out-of-phase time varying voltages, the method comprising: stepping the stepping motor to a next micro-step; determining that a predetermined motor parameter of a first coil of the two coils is to be sampled; opening the first coil for a predetermined period, wherein the predetermined period is less than or equal to a micro-step; sampling the predetermined motor parameter of the first coil during the predetermined period; closing the first coil; and detecting if a stall condition exists. Determining that a predetermined motor parameter of a first coil of the two coils is to be sampled may further comprise determining that one of either a back electro-magnetic force (BEMF) or a flyback voltage of the first coil is to be sampled. Detecting if a stall condition exists may further comprise: integrating the predetermined motor parameter; and comparing the integrated predetermined parameter to a threshold to produce a comparison result. The method may further comprise using the comparison result to determine if a stall condition exists. The method may further comprise incrementing or decrementing a value in an accumulator register based on the comparison result. The method may further comprise loading the accumulator register with a preset value based on a sampling rate of the predetermined motor parameter. The preset value may be stored in a look-up table of a plurality of preset values, wherein each value of the plurality of preset values corresponds to one of a plurality of sampling rates. The sampling rate may be determined by a frequency of a clock signal. Determining that a predetermined motor parameter of a first coil of the two coils is to be sampled may further comprise determining that a motor flux of the first coil is to be sampled.

In another aspect, there is provided, a method for detecting a stall condition in a stepping motor, the stepping motor having two coils and a rotor, the stepping motor being microstepped by substantially continuously driving both of the two coils with out-of-phase time varying voltages, the method comprising: stepping the stepping motor to a next micro-step; determining that a predetermined motor parameter of a first coil of the two coils is to be sampled; opening the first coil for a predetermined period, wherein the predetermined period is less than or equal to a micro-step; sampling the predetermined motor parameter of the first coil during the predetermined period; closing the first coil; integrating the predetermined motor parameter; and comparing the integrated predetermined parameter to a threshold to produce a comparison result; and using the comparison result to determine if a stall condition exists. Determining that a predetermined motor parameter of a first coil of the two coils is to be sampled may further comprise determining that a back electro-magnetic force (BEMF) of the first coil is to be sampled. Determining that a predetermined motor parameter of a first coil of the two coils is to be sampled may further comprise determining that a motor flux of the first coil is to be sampled. The method may further comprise using the comparison result to determine if a stall condition exists. The method may further comprise incrementing or decrementing a value in an accumulator register based on the comparison result. The method may further comprise loading the accumulator register with a preset value based on a sampling rate of the predetermined motor parameter. The preset value may be stored in a look-up table of a plurality of preset values, wherein each value of the plurality of preset values corresponds to one of a plurality of sampling rates. The sampling rate may be determined by a frequency of a clock signal.

In yet another aspect, there is provided, a motor controller, comprising: a coil driving circuit for driving a first coil and a second coil of a stepper motor; a control circuit, coupled to the coil driving circuit, for causing the coil driving circuit to micro-step the stepper motor by supplying each of the first and second coils with substantially continuous out-of-phase time varying voltages, and the control circuit for causing either the first coil or the second coil to periodically open during a micro-step; and a stall detection circuit, coupled to the coil driving circuit, for sampling a predetermined motor parameter of one of either the first coil or the second coil during the micro-step when the one of either the first coil or the second coil is open, to determine if the stepper motor has stalled. The predetermined motor parameter may be a back electro-magnetic force (BEMF). In another embodiment, the predetermined motor parameter may be a flyback voltage of the coil. The stall detection circuit may comprise: an integrator for integrating the predetermined motor parameter; and a comparator for comparing the predetermined motor parameter with a threshold voltage to detect a stall condition of the stepper motor.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 2:
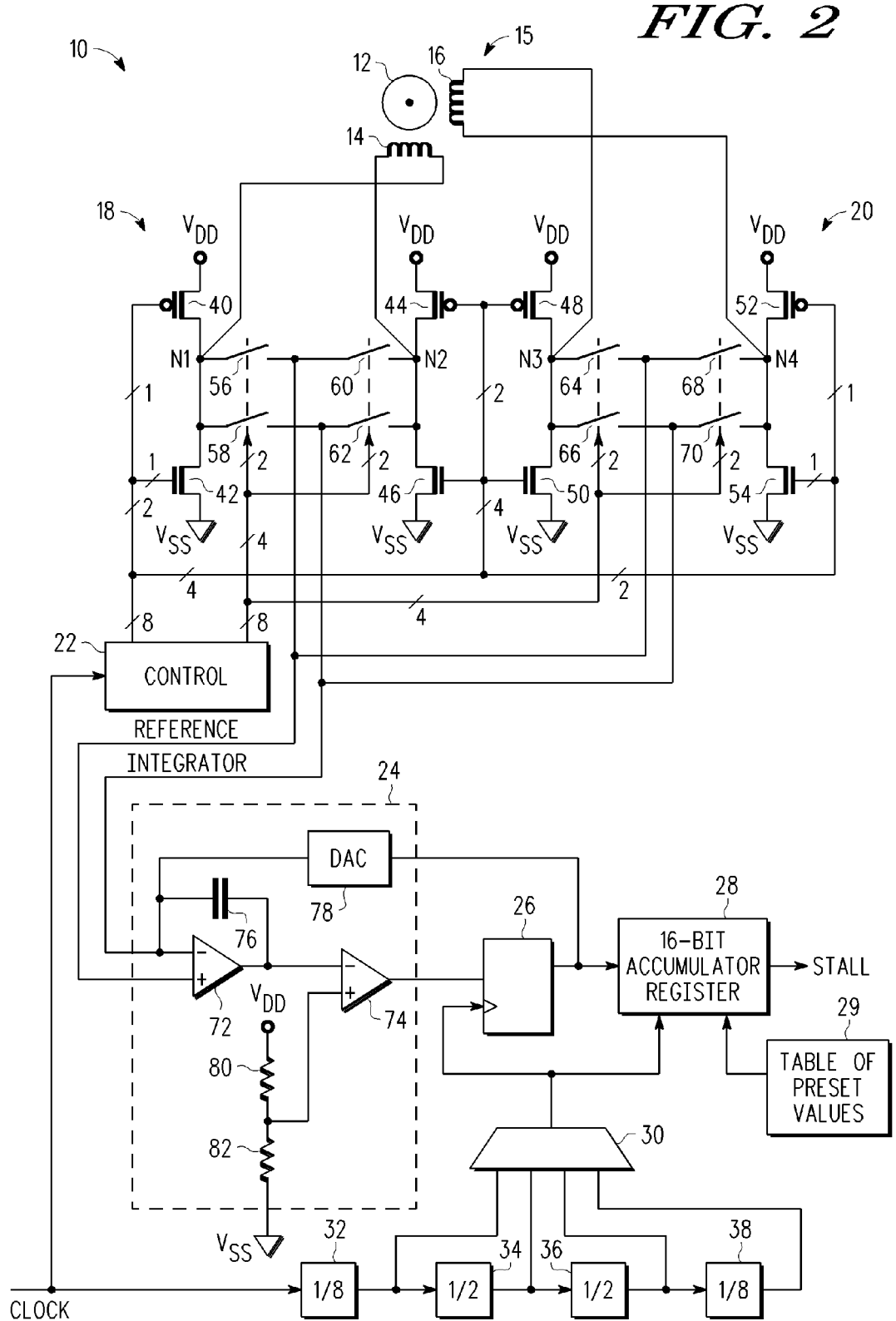
FIG. 2 illustrates, in partial block diagram form and partial schematic diagram form, a stepping motor controller in accordance with an embodiment.

FIG. 2 illustrates, in partial block diagram form and partial schematic diagram form, a stepping motor controller 10 in accordance with an embodiment. Motor controller 10 includes H-bridges 18 and 20, control circuit 22, sigma-delta converter 24, flip-flop 26, 16-bit accumulator register 28, table of preset values 29, multiplexer 20, and clock dividers 32, 34, 36, and 38. H-bridge 18 includes P-channel transistors 40 and 44, N-channel transistors 42 and 46, and switches 56, 58, 60, and 62. H-bridge 20 includes P-channel transistors 48 and 52, N-channel transistors 50 and 54, and switches 64, 66, 68, and 70. H-bridge 18 is coupled to coil 14 and H-bridge 20 is coupled to coil 16. Sigma-delta converter 24 includes amplifiers 72 and 74, capacitor 76, digital-to-analog converter (DAC) 78, and resistors 80 and 82.

In the illustrated embodiment, motor controller 10 is coupled to coils 14 and 16. Rotor 12 and coils 14 and 16 comprise a two-phase stepping motor 15. Coils 14 and 16 are arranged substantially perpendicular to each other. Timed driving currents through coils 14 and 16 cause rotor 12 to rotate. Stepping motors of this type are well known.

In H-bridge 18, P-channel transistor 40 has a first current electrode (source) coupled to a power supply voltage terminal labeled "VDD", a control electrode (gate) coupled to control circuit 22, and a second current electrode (drain) coupled to a first terminal of coil 14 at an internal node N1. N-channel transistor 42 has a drain coupled to the drain of transistor 40 at node N1, a gate coupled to receive a control signal from control circuit 22, and a source coupled to a power supply voltage terminal labeled "VSS". P-channel transistor 44 has a source coupled to VDD, a gate coupled to receive a control signal from control circuit 22, and a drain coupled to a second terminal of coil 14 at node N2. N-channel transistor 46 has a drain coupled to the drain of transistor 44 at node N2, a gate coupled to receive a control signal from control circuit 22, and a source coupled to power supply voltage terminal VSS. Switches 56 and 60 coupled in series between nodes N1 and N2 and are controlled by control signals from control circuit 22. Likewise, switches 58 and 62 are coupled in series between nodes N1 and N2 and are controlled by control signals from control circuit 22. The junction between switches 56 and 60 is coupled to a first input terminal of amplifier 72 for providing a voltage labeled "REFERENCE", and the junction between switches 58 and 62 is coupled to a second input terminal of amplifier 72 for providing a voltage labeled "INTEGRATOR". As can be seen in FIG. 2, each gate of transistors 40, 42, 44, and 46 and each of switches 56, 58, 60, and 62 receives a separate control signal from control circuit 22. H-bridge 20 is coupled together the same as H-bridge 18.

In sigma-delta converter 24, capacitor 76 has a first plate electrode coupled to the first input terminal of amplifier 72, and a second plate electrode coupled to an output terminal of amplifier 72. Note that amplifier 72 and capacitor 76 form an integrator. The output terminal of amplifier 72 is coupled to a first input terminal of amplifier 74. A second input terminal of receives a reference voltage from a voltage divider formed by the series-connected resistors 80 and 82. An output of amplifier 74 is coupled to an input of flip-flop 26. DAC 78 is coupled between an output of flip-flop 26 and the first input of amplifier 72. Accumulator register 28 has an input coupled to the output of flip-flop 26, an input coupled to table of preset values 29, an input coupled to an output of multiplexer 30, and an output for providing a stall indication labeled "STALL". Clock divider 32 has an input coupled to receive a clock signal labeled "CLOCK", and an output coupled to a first input of each of multiplexer 30 and divider 34. Divider 34 has an output coupled to a second input of multiplexer 30. Divider 36 has an input coupled to an output of divider 34, and an output coupled to both of a third input of multiplexer 30 and an input of divider 38. An output of divider 38 is coupled to a fourth input of multiplexer 30. Multiplexer 30 is controlled by control circuit 22, and provides a predetermined divided clock signal to flip-flop 26 and to accumulator register 28 according it which input of multiplexer 30 is selected by control circuit 22.

When one coil is undriven while the other coil is driven, a voltage called a back electromotive force (BEMF) can be observed across the terminals of the undriven coil. In one embodiment, the BEMF is sampled and integrated during a micro-step. A flyback voltage is a voltage that appears across a coil when the coil is first opened and has a relatively short duration. The flyback voltage is inverted across the coil until stored energy in the coil dissipates. The stored energy is determined by the coil characteristics and a magnitude of current that flows through the coil. In one embodiment the BEMF is used to detect a stall condition during a micro-step. In another embodiment the flyback voltage is used. The flyback energy and the time it takes to dissipate the energy are affected by the presence or absence of BEMF.

Figure 3:
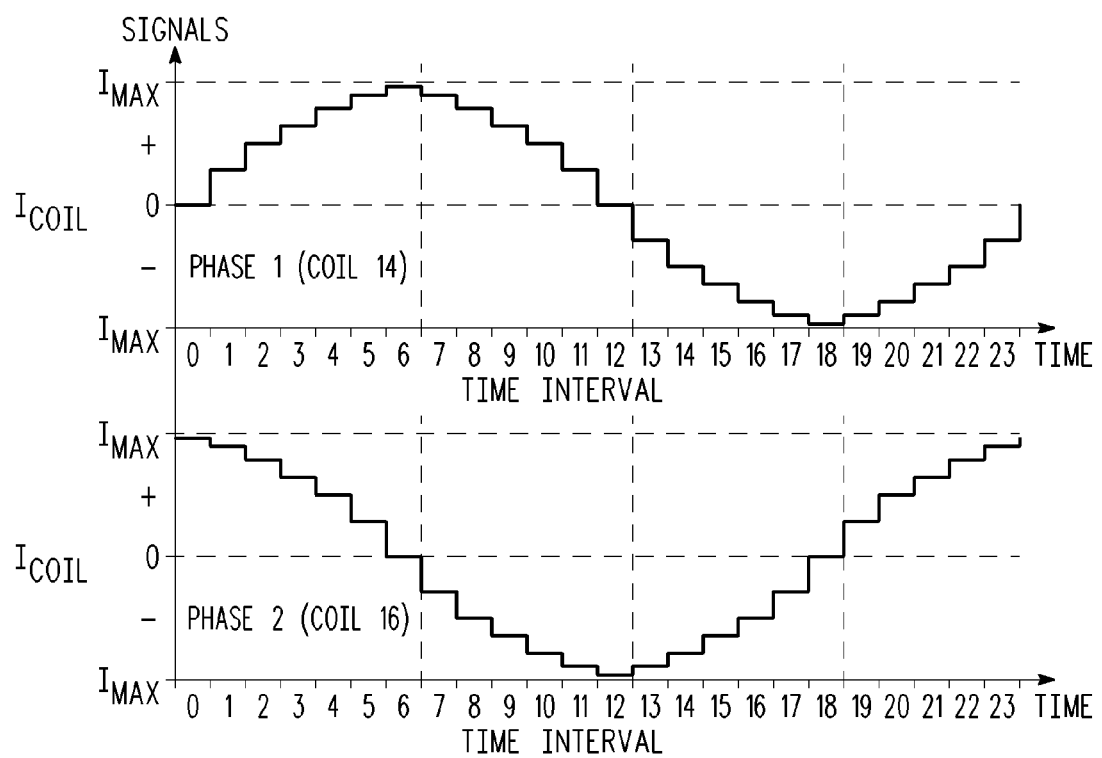
FIG. 3 illustrates coil drive currents for micro-step driving of the stepping motor of FIG. 2.

FIG. 3 illustrates micro-step drive currents for one electrical cycle for operating stepping motor 15. As shown in FIG. 3, the coil drive currents are out of phase, and preferably, 90 degrees out-of-phase. By providing appropriate drive voltages to the transistors of H-bridges 18 and 20, the micro-step drive currents illustrated in FIG. 3 can be provided to coils 14 and 16. Unlike the full-step drive method illustrated in FIG. 1, where one coil is driven while the other is not, when driving a stepping motor with micro-steps both coils are normally always driven. Micro-stepping means that the stepping motor is being stepped by substantially continuously driving both of the two coils with out-of-phase time varying voltages. In full-step driving, the coil being driven receives a relatively constant drive current for substantially the full step (labeled IMAX in FIG. 1 and FIG. 3) and is then abruptly cut off. When micro-stepping, the drive current is stepped using relatively small time intervals for each step. A micro-step time interval is significantly smaller than the time interval of a full-step. Referring to FIG. 3, the drive current for coil 14 steps from zero current at time interval 0 to maximum current IMAX in one direction for 90 degrees of one electrical cycle at the end of time interval 6, and then steps down through zero current to a maximum current IMAX in the other direction at the end time interval 18. By way of example, to obtain the drive current through coil 14 between time intervals 0 and 6, control 22 may make transistors 40 and 46 increasingly more conductive each step with switches 56, 58, 60, and 62 open. One electrical cycle ends at the end of time interval 23. The drive current for coil 16 is stepped similarly except that it is 90 degrees out of phase with the drive current for coil 14. As is well known in the art, the direction of the current is determined by which transistors of H-bridges 18 and 20 are conductive. The drive currents may be stepped by varying the bias current for the gates of drive transistors 40, 42, 44, and 46 for H-bridge 18 and for the gates of drive transistors 48, 50, 52, and 54 for H-bridge 20. In another embodiment, the amount of current for each step may be changed another way, for example, by varying the supply voltage provided to the H-bridges. Note that in one embodiment, as illustrated in FIG. 3, the coils are micro-step driven with pulse width modulators (PWMs) to provide a current that is stepped for predetermined time intervals to provide an approximation of a sinusoid. In another embodiment, coils 14 and 16 may be micro-step driven using analog levels as illustrated in FIGS. 4-7 to provide a smoother approximation of a sinusoid.

To allow detection of rotor movement, one of the normally driven coils is periodically opened, or not driven, for a period of time that is equal to or less than one micro-step. During the period of time, a predetermined coil parameter, such as BEMF or flyback voltage is sampled and processed. As a simple example, coils 14 and 16 may be alternately sampled during each micro-step, or time interval, where the drive current passes zero. In FIG. 3, the drive current for coil 14 passes zero at intervals 0 and 12, and the drive current for coil 16 passes zero at intervals 6 and 18.

Figure 4:
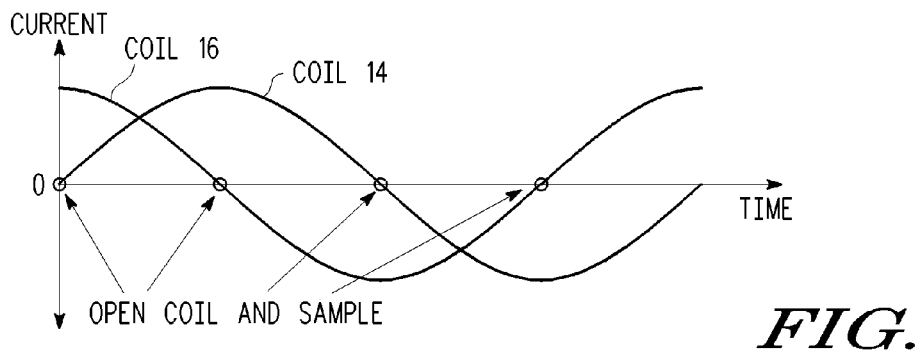
FIGS. 4-7 illustrate waveforms of coil drive currents provided by the motor controller of FIG. 2.
Figure 5:
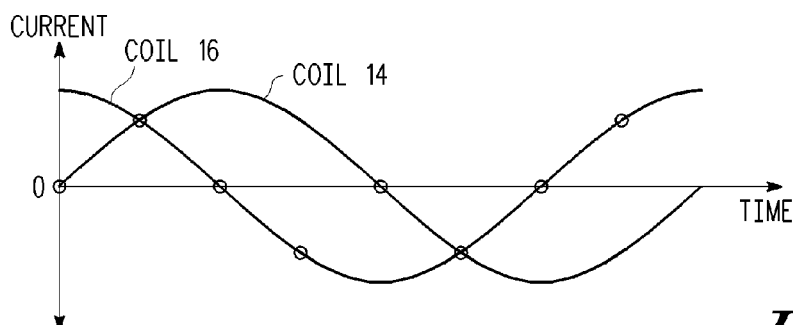
Figure 6:
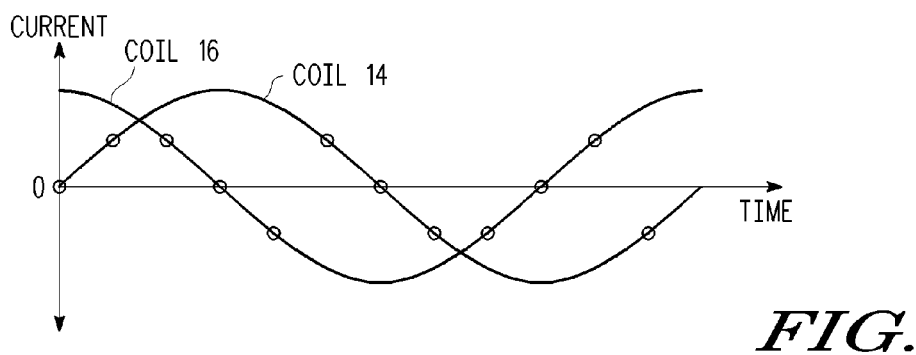
Figure 7:
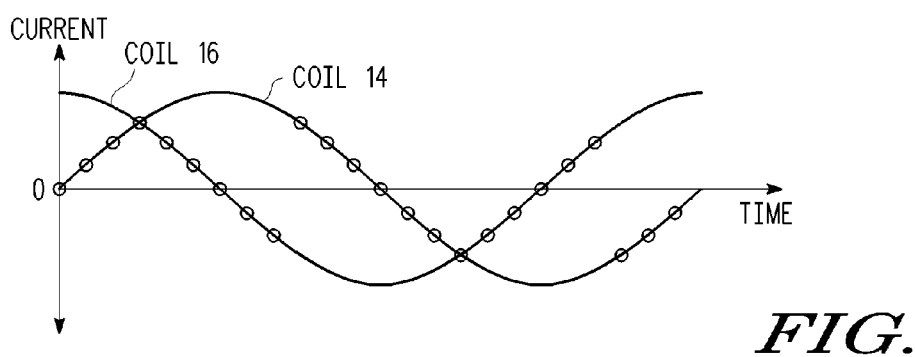

Different time intervals, or sampling rates, can be chosen for stall detection. Either coil can be opened and sampled during any point in the electrical cycle for stall detection. FIGS. 4-7 illustrate waveforms of coil drive currents provided by motor controller 10 of FIG. 2 having various coil sampling rates for stall detection. For simplicity of illustration, the coil currents are drawn using smooth waveforms. The points on each of the coil current waveforms when the coils are opened and sampled are indicated with a circle. Sampling more frequently increases stall detection resolution. It may be desirable to sample more frequently when, for example, the motor is rotating at a relatively higher speed. In FIG. 4, the coils are sampled each time the zero current point is reached, providing four sample points for stall detection each electrical cycle. In FIG. 5, the coils are opened and sampled 4 times each for a total of 8 samples each electrical cycle. In FIG. 6, each coil is opened and sampled 6 times for a total of 12 samples each electrical cycle. Finally, in FIG. 7, each coil is opened and sampled 12 times for a total of 24 samples each electrical cycle. In other embodiments, the number of samples, and therefore the sampling rate, may be different.

As discussed above, either coil can be opened and sampled at any point of the electrical cycle and for any number of times. In the illustrated embodiment of FIG. 2, the number of times a coil is sampled is determined by the clock frequency received by flip-flop 26 and accumulator 28. The clock frequency is adjusted by selecting an input of multiplexer 30 to receive a divided clock signal. The division ratios in FIG. 2 are provided by way of example, other embodiments may use different dividers.

To perform a stall detection of, for example, coil 14, coil 14 is opened by making transistors 40, 42, 44, and 46 of H-bridge 18 substantially non-conductive with switches 56, 58, 60, and 62 open. The predetermined motor parameter, such as the BEMF or flyback voltage, of the open coil 14 is sampled by coupling the first and second terminals of coil 14 to the first and second inputs of sigma-delta 24. This may be accomplished by closing switches 56 and 62, or alternately, closing switches 58 and 60, depending on rotation direction. The sampled motor parameter is integrated for a predetermined amount of time using amplifier 72 and capacitor 76. Note that integrating BEMF provides a motor flux measurement and integrating the flyback voltage provides motor energy. The amount of time that the sampled motor parameter is integrated depends on the particular characteristics of the motor. DAC 78 is used to help set a threshold for sigma-delta converter 24. The result of the integration is provided to amplifier 74. Amplifier 74 compares the output to a predetermined voltage to determine a logic state that is used to increment or decrement accumulator 28. Accumulator 28 is a 16-bit signed register for storing an accumulated valve indicative of the motor parameter. A table of preset motor parameter values for motor rotation is stored in table 29. A preset value, or a plurality of preset values, is stored for each of the plurality of sampling rates illustrated in FIGS. 4-7. For example, the preset value is different for each sample point because the drive voltage at each sample point is different as illustrated in FIGS. 4-7. In another embodiment, the sampling rates may be different than those illustrated. The accumulated value in accumulator register 28 is compared to an entry of table 29 to detect a stall condition. The preset value in table 29 determines a threshold. If the value in accumulator register 28 is less than the table 29 entry, then the motor parameter of the motor is less than the rotational motor parameter and the motor has stalled. In one embodiment, a STALL indication may be provided when a stall is detected to indicate that stepper motor 15 has returned to a predefined position, such as the zero mark on an automotive speedometer. In another embodiment, the stall may be used, for example, to generate an interrupt in a microcontroller (not shown) associated with motor controller 10 to stop or reset motor operation.

Figure 8:
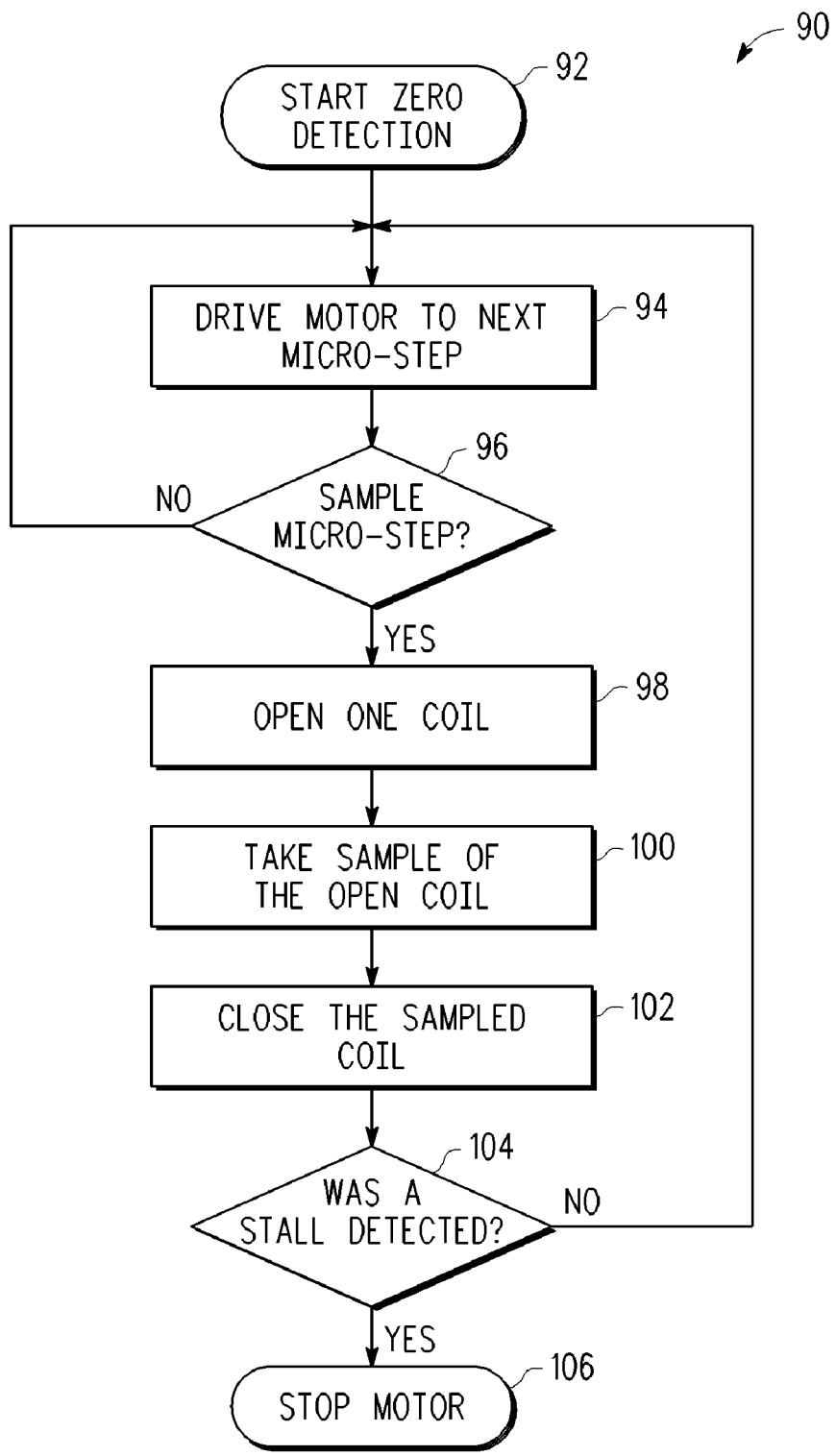
FIG. 8 illustrates a method for detecting a stall in accordance with an embodiment.

FIG. 8 illustrates a method 90 for detecting a stall condition in a stepping motor in accordance with an embodiment. At step 92, stall detection is enabled. Stall detection may be enabled by setting a control bit (not shown) in control circuit 22. As indicated by step 92, a stall may be used as an indication that a pointer on a gauge has returned to a marked "zero" location by hitting a stopper. At step 94, the motor is driven to the next micro-step of an electrical cycle by applying the required drive currents for the particular micro-step. At decision step 96, it is determined if the current step is a micro-step that is to be sampled for stall detection. Micro-steps for stall detection are predetermined as indicated above in the discussion of FIGS. 3-7. If the current micro-step has not been designated for stall detection, then the flow returns to step 94 and the motor is driven for the next micro-step. If the current micro-step has been designated for stall detection, the flow continues to step 98. At step 98, one of the motor coils, such as coil 14 or coil 16 in FIG. 2, is opened by causing all the four current driving transistors to be substantially non-conductive. For example, coil 16 (FIG. 2) is opened by biasing transistors 48, 50, 52, and 54 to be non-conductive and opening switches 64, 66, 68, and 70. At step 100, a sample of a predetermined motor parameter, such as BEMF or flyback voltage, is taken from the opened coil. The time period for sampling is one micro-step or less. At step 102, the sampled coil is closed and driven in the next micro-step. At decision step 104, it is determined if the motor has stalled. If the motor has stalled, then the motor controller stops drive currents to the coils. If the motor has not stalled, or reached a "zero" location, then flow continues at step 94 and as discussed above.

Figure 9:
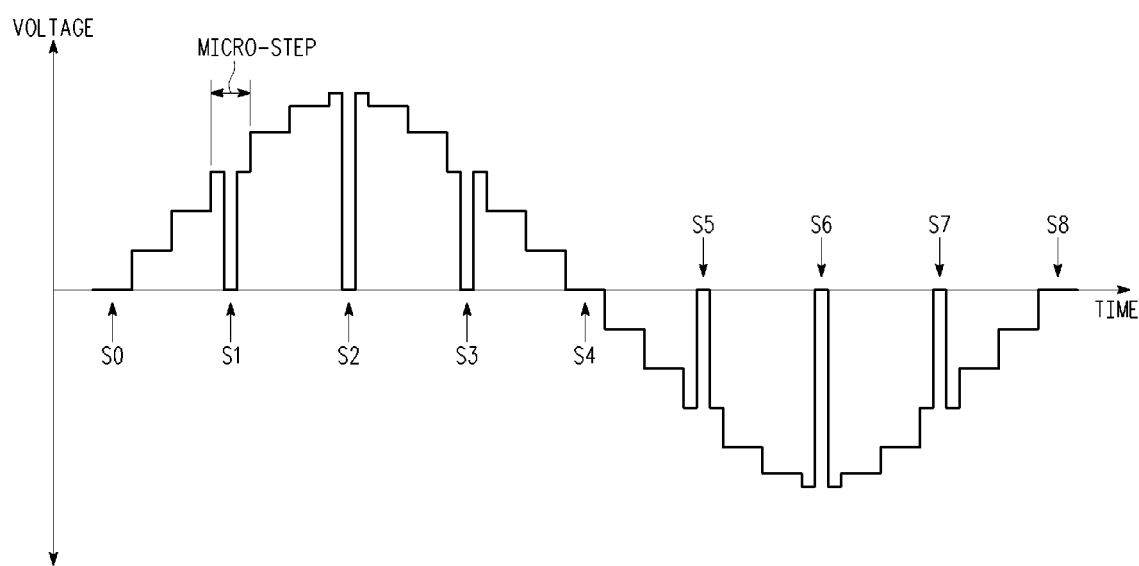
FIG. 9 illustrates a waveform of a coil drive current with stall detection during micro-stepping.

FIG. 9 illustrates one example waveform of a coil drive voltage for one of the two drive coils. The waveform illustrates opening and sampling the coil for stall detection during micro-stepping. In FIG. 9, a sinusoidal drive current is roughly approximated by micro-stepping the drive voltage. During an electrical cycle, the coil is sampled at a predefined interval as discussed above in connection with FIGS. 4-7. For example, the coil of FIG. 9 is sampled 8 times as indicated by samples S0-S7. Sample S8 is the first sample of the next electrical cycle. Each time the coil is opened and sampled to detect a stall condition, the coil drive voltage is removed. Sample point S1 is used to illustrate that the sample time may be less than a micro-step in time duration. The coil is opened in order to sample a motor parameter such as for example, BEMF or flyback voltage. The coil is opened and sampled at a predetermined point during a micro-step depending on coil characteristics and the particular motor parameter being sampled.

Figure 10:
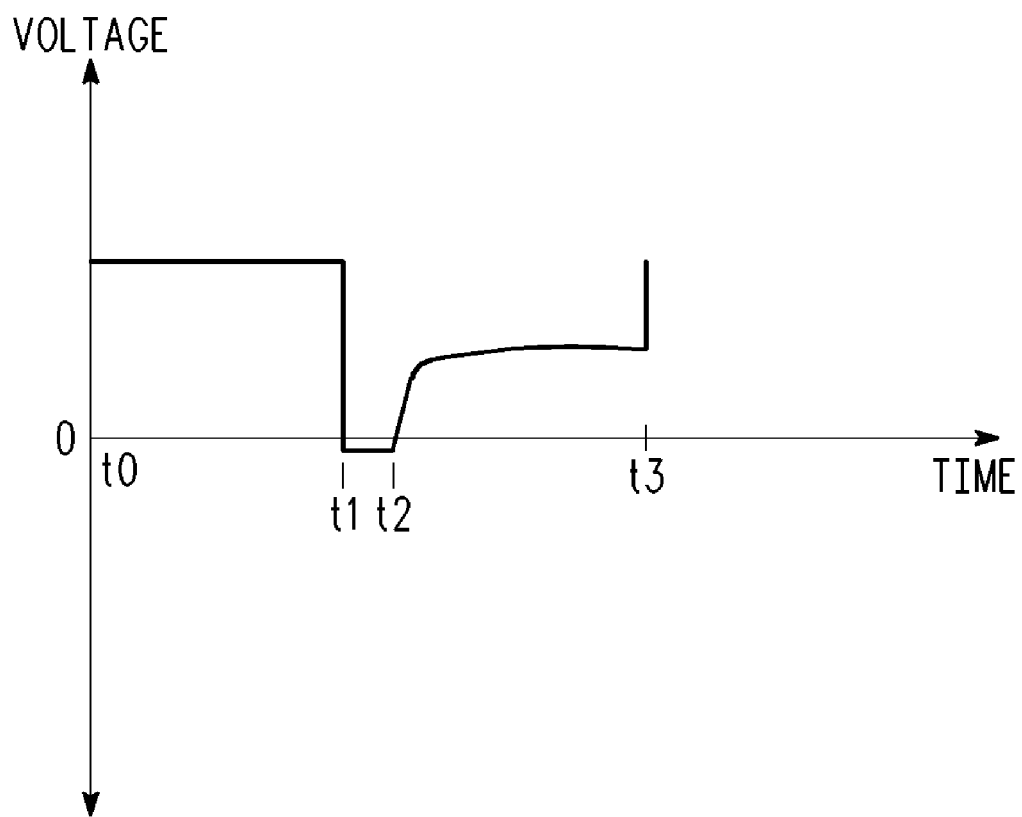
FIG. 10 illustrates a waveform of a coil flyback voltage during stall detection.

FIG. 10 illustrates a waveform of a coil flyback voltage during stall detection. Between times t0 and t1 (a micro-step), the coil is being driven at a predetermined voltage depending on where the motor is in the electrical cycle. At time t1, the coil is opened and sampled. As can be seen in FIG. 10, the flyback voltage initially inverts, or becomes negative. The coil remains open for a predetermined period of time as necessary to sample the flyback voltage. At time t2, the flyback voltage dissipates, and the BEMF is present. If the coil is not open long enough, there will not be sufficient time for an adequate sample. As can be seen in FIG. 10, if the coil is sampled for too long, the sample may contain BEMF voltage as well as flyback voltage. How long the coil is sampled is determined by the particular coil and circuit characteristics. At time t3, a next micro-step drive voltage is applied, which, may be greater than or less than the previous micro-step drive voltage depending on where the motor is in the electrical cycle. If the flyback voltage is to be sampled, the sample should be taken soon after the coil is opened for a particular time duration. Conversely, if BEMF is to be sampled, then the sample should not be taken during the time when the flyback voltage is present.

By detecting stalls during a micro-step, smoother motor movement during stall detection is provided. Also, stall detection can occur faster and with greater resolution because detection is not limited to a full-step boundary.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 2 and the discussion thereof describe an exemplary motor controller, this motor controller is presented merely to provide a useful reference in discussing various aspects of the invention. Of course, the description of the motor controller has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of controller 10 are circuitry located on a single integrated circuit or within a same device. Alternatively, controller 10 may include any number of separate integrated circuits or separate devices interconnected with each other. Also for example, controller 10 or portions thereof may be soft or code representations of physical circuitry or of logical representations convertible into physical circuitry. As such, controller 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a stall condition in a stepping motor, the stepping motor having two coils and a rotor, the stepping motor being micro-stepped by substantially continuously driving both of the two coils with out-of-phase time varying voltages, the method comprising:
   stepping the stepping motor to a next micro-step;
   determining that a predetermined motor parameter of a first coil of the two coils is to be sampled;
   opening the first coil for a predetermined period, wherein the predetermined period is less than or equal to a micro-step;
   sampling the predetermined motor parameter of the first coil during the predetermined period;
   closing the first coil; and
   detecting if a stall condition exists.

2. The method of claim 1, wherein determining that a predetermined motor parameter of a first coil of the two coils is to be sampled further comprises determining that one of either a back electro-magnetic force (BEMF) or a flyback voltage of the first coil is to be sampled.

3. The method of claim 1, wherein detecting if a stall condition exists further comprises:
   integrating the predetermined motor parameter; and
   comparing the integrated predetermined parameter to a threshold to produce a comparison result.

4. The method of claim 3, further comprising using the comparison result to determine if a stall condition exists.

5. The method of claim 3, further comprising incrementing or decrementing a value in an accumulator register based on the comparison result.

6. The method of claim 5, further comprising loading the accumulator register with a preset value based on a sampling rate of the predetermined motor parameter.

7. The method of claim 6, wherein the preset value is stored in a look-up table of a plurality of preset values, wherein each value of the plurality of preset values corresponds to one of a plurality of sampling rates.

8. The method of claim 6, wherein the sampling rate is determined by a frequency of a clock signal.

9. The method of claim 1, wherein determining that a predetermined motor parameter of a first coil of the two coils is to be sampled further comprises determining that one of either a motor flux of the first coil or energy of the first coil is to be sampled.

10. A method for detecting a stall condition in a stepping motor, the stepping motor having two coils and a rotor, the stepping motor being micro-stepped by substantially continuously driving both of the two coils with out-of-phase time varying voltages, the method comprising:
   stepping the stepping motor to a next micro-step;
   determining that a predetermined motor parameter of a first coil of the two coils is to be sampled;
   opening the first coil for a predetermined period, wherein the predetermined period is less than or equal to a micro-step;
   sampling the predetermined motor parameter of the first coil during the predetermined period;
   closing the first coil;
   integrating the predetermined motor parameter; and comparing the integrated predetermined parameter to a threshold to produce a comparison result; and using the comparison result to determine if a stall condition exists.

11. The method of claim 10, wherein determining that a predetermined motor parameter of a first coil of the two coils is to be sampled further comprises determining that one of either a back electro-magnetic force (BEMF) or a flyback voltage of the first coil is to be sampled.

12. The method of claim 10, wherein determining that a predetermined motor parameter of a first coil of the two coils is to be sampled further comprises determining that one of either a motor flux of the first coil or energy of the first coil is to be sampled.

13. The method of claim 10, further comprising using the comparison result to determine if a stall condition exists.

14. The method of claim 10, further comprising incrementing or decrementing a value in an accumulator register based on the comparison result.

15. The method of claim 14, further comprising loading the accumulator register with a preset value based on a sampling rate of the predetermined motor parameter.

16. The method of claim 15, wherein the preset value is stored in a look-up table of a plurality of preset values, wherein each value of the plurality of preset values corresponds to one of a plurality of sampling rates.

17. The method of claim 15, wherein the sampling rate is determined by a frequency of a clock signal.

18. A motor controller, comprising:

a coil driving circuit for driving a first coil and a second coil of a stepper motor;

a control circuit, coupled to the coil driving circuit, for causing the coil driving circuit to micro-step the stepper motor by supplying each of the first and second coils with substantially continuous out-of-phase time varying voltages, and the control circuit for causing either the first coil or the second coil to periodically open during a micro-step; and a stall detection circuit, coupled to the coil driving circuit, for sampling a predetermined motor parameter of one of either the first coil or the second coil during the micro-step when the one of either the first coil or the second coil is open, to determine if the stepper motor has stalled.

19. The motor controller of claim 18, wherein the predetermined motor parameter is one of either a back electro-magnetic force (BEMF) or a flyback voltage.

20. The motor controller of claim 18, wherein the stall detection circuit comprises:

an integrator for integrating the predetermined motor parameter; and a comparator for comparing the predetermined motor parameter with a threshold voltage to detect a stall condition of the stepper motor.

* * * * *